July 14, 1942.   E. F. TAFEL   2,289,942
MATERIAL FLOW CONTROL MEANS FOR RECIPROCATING CONVEYERS
Filed July 25, 1940   4 Sheets-Sheet 1

INVENTOR:
Edward F. Tafel
BY
Sylvester H. Lechner
ATTORNEYS.

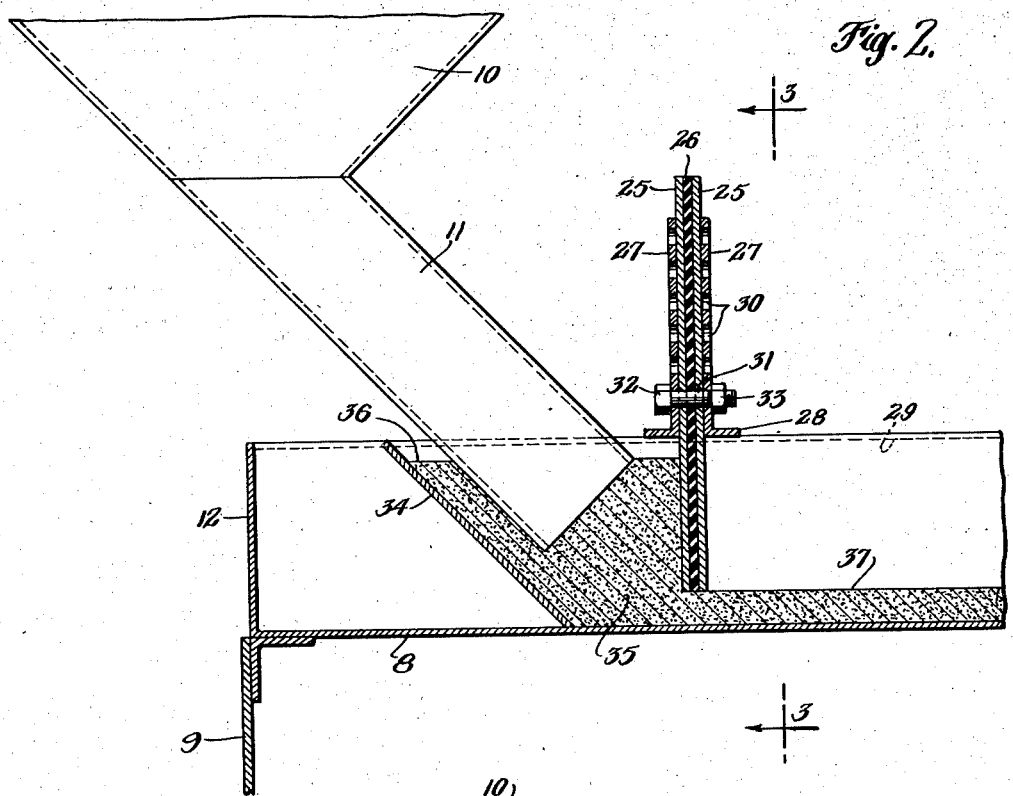
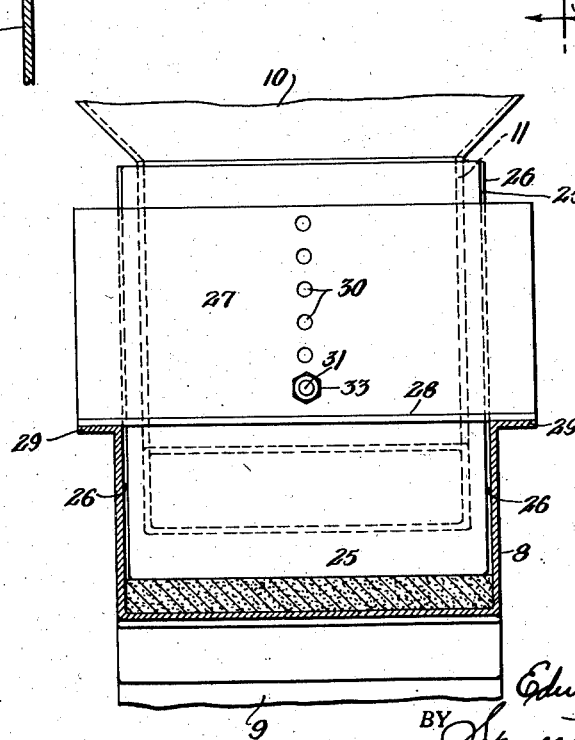

July 14, 1942.  E. F. TAFEL  2,289,942
MATERIAL FLOW CONTROL MEANS FOR RECIPROCATING CONVEYERS
Filed July 25, 1940  4 Sheets-Sheet 3

INVENTOR:
Edward F. Tafel
BY
Synnestvedt & Lechner
ATTORNEYS.

July 14, 1942.  E. F. TAFEL  2,289,942

MATERIAL FLOW CONTROL MEANS FOR RECIPROCATING CONVEYERS

Filed July 25, 1940  4 Sheets-Sheet 4

INVENTOR:
Edward F. Tafel
BY Synnestvedt & Lechner
ATTORNEYS.

Patented July 14, 1942

2,289,942

UNITED STATES PATENT OFFICE 2,289,942

MATERIAL FLOW CONTROL MEANS FOR RECIPROCATING CONVEYERS

Edward F. Tafel, Painesville, Ohio

Application July 25, 1940, Serial No. 347,350

7 Claims. (Cl. 198—52)

This invention relates to means for controlling the flow or volume of material carried by a reciprocating conveyer and has particular reference to the provision of an improved gate mechanism for use in controlling the quantity of material which can be transported and delivered by the conveyer. It is particularly adapted for use with a reciprocating conveyer wherein the conveying action is produced by what is known as a differential vibration, i. e., one in which the conveyer element or trough moves relatively quickly in one direction as compared with the movement in the opposite direction. In conveyers of this kind the low speed stroke causes the material to move with the conveyer trough and the high speed stroke "slips" the conveyer under the material in the reverse direction.

Conveyers of this type are illustrated in my prior Patent No. 1,926,659, issued September 12, 1933, as well as in my copending application No. 136,556, filed April 13, 1937, and subsequently issued on September 17, 1940, as Patent No. 2,214,755.

In conveyers of the type specified it is preferable to employ reciprocating movement upwards of about 500 to 600 cycles per minute with a stroke which is extremely small and with the conveying element arranged on its supports so that there is, for all practical purposes, no tossing action imparted to the material in the conveyer.

In conveyers of the type under consideration it is, of course, possible to control the volume of material delivered by the conveyer to a large extent at least, by varying the speed of operation and the amplitude of vibration, but although this is satisfactory for many services there are occasions when a somewhat more accurate control is advisable, and the present invention is primarily concerned with the provision of a supplemental means for very accurately controlling the quantity of material which is transported and delivered by a reciprocating conveyer.

Stated somewhat more specifically, my invention contemplates the following objects:

The provision of a controlling or regulating means of the character described which is more simple and, therefore, less costly than previous devices familiar to the art; one which can be more easily and cheaply maintained in service; one which will prevent to as great a degree as possible the choking up of the opening in the bin which delivers to the conveyer; one in which the material in the bin spout is kept in a constant state of agitation so as to maintain a steady and uniform supply of material; one in which there is no undue crushing action or attrition of the material being conveyed; and one in which there is very little if any opportunity for any material to become wedged between the surfaces of the trough and the edges of the control gate.

It is also an object of my invention to provide a mechanism by means of which it is possible to very accurately and constantly proportion the flow of two or more materials which it may be desired to transport at the same time and mix at the point of delivery.

How the foregoing objects, together with such other objects as may appear hereinafter or are incident to my invention, are attained is illustrated in preferred forms in the accompanying drawings, wherein—

Figure 2 is a vertical longitudinal section through one end of a reciprocating conveyer illustrating one embodiment of my improved control means;

Figure 3 is a section on the line 3—3 of Figure 2;

Figure 1:
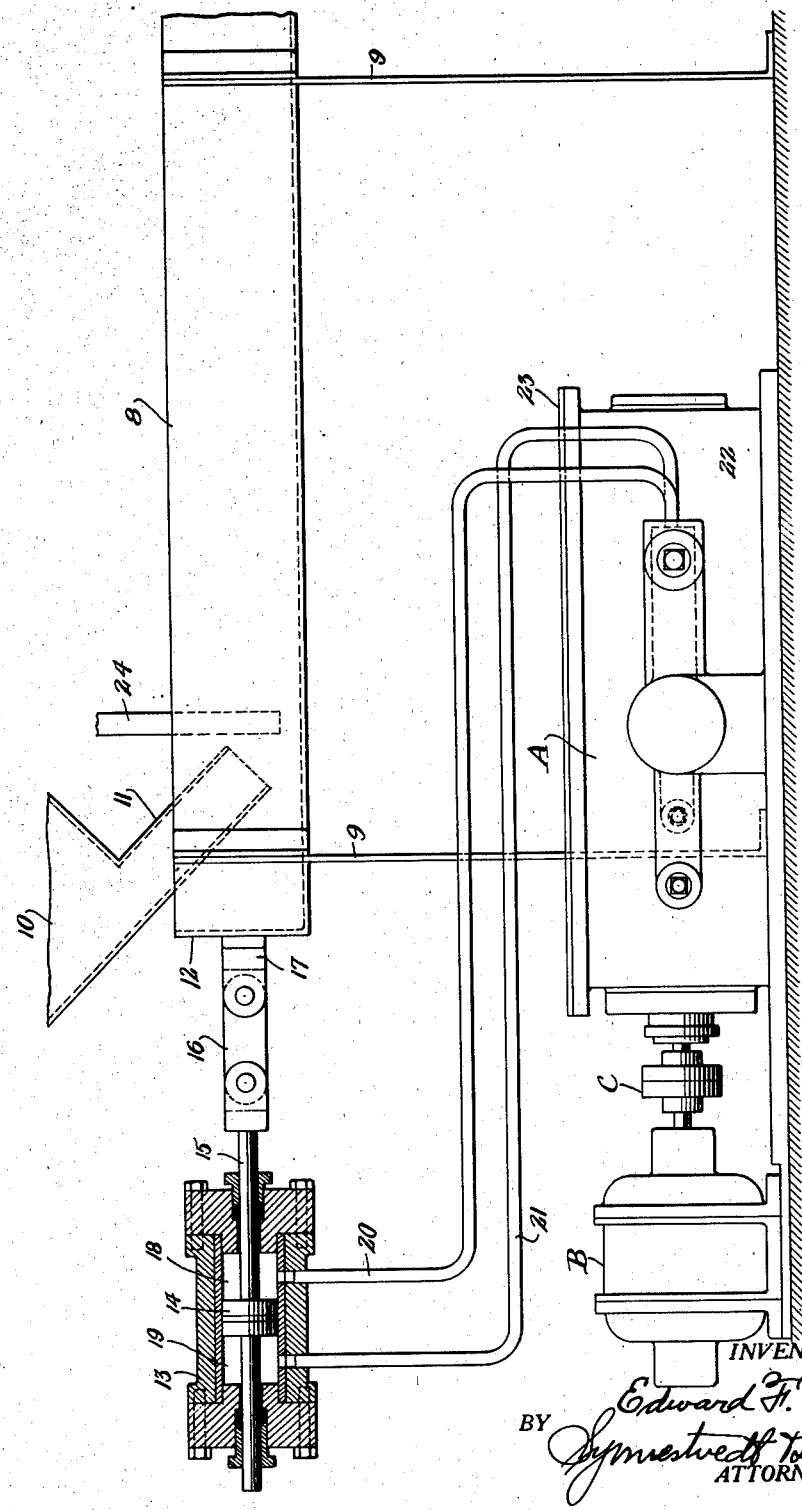
Figure 1 is a side elevational view of a portion of a conveyer trough with my invention applied thereto and with a driving mechanism such as shown in my pending application above referred to, the operating cylinder of which latter mechanism is shown in vertical longitudinal section.

Referring first to Figure 1, it will be seen that I have illustrated a conveying element or trough 8 mounted upon the vertical leaf spring supports 9 which have sufficient inherent rigidity to give adequate support to the trough and the material flowing therein but which are sufficiently flexible to permit the desired short stroke and rapid differential vibration. Indeed, the supports 9 have sufficient strength and inherent rigidity to enable them to return the trough to neutral or normal position in the absence of any displacing force.

The material to be conveyed is supplied to the trough 8 from the bin 10 having the downwardly and forwardly projecting spout 11 which projects well into the trough, as shown, so that the outlet or discharge opening thereof is located well below the upper edge of the trough sides. The spout 11 is located so as to deliver the material to be conveyed at a point closely adjacent the rear wall 12 of the trough 8.

The means for imparting the desired differential reciprocation or vibration consists of an operating cylinder 13, which may be rigidly mounted on any convenient fixed support, and a piston 14 which is coupled to the conveying element or trough 8 by means of the piston stem 15 and link mechanism 16, there being a fitting 17 suitably connecting the link to the trough.

The piston 14 in the operating cylinder 13 is driven by a hydraulic unit indicated generally by the letter A, this unit, in turn, being actuated by a driving motor B through the intermediation of a flexible coupling or aligning device such as shown at C.

The cylinder 13 has chambers 18 and 19 at opposite sides of the piston 14, which chambers are coupled by means of the pipes 20 and 21 with the hydraulic driving unit shown at A. The driving unit includes a casing 22 having a removable cover or lid 23, the casing 22 serving as a reservoir for the actuating fluid for the system, preferably oil. The details of the driving mechanism will not be described any further because, in and of themselves, they form no part of the present invention and are fully illustrated, described and claimed in my copending application, above referred to. Suffice it to say for the purposes of the present disclosure, that the mechanism imparts to the conveying trough 8 a differential vibration or high speed reciprocation which is relatively fast in one direction and very much slower in the opposite direction, the conveying action taking place on the slow stroke while the fast stroke slips the conveyer beneath the material being conveyed.

One embodiment of my improved gate mechanism is illustrated somewhat diagrammatically at 24 in Figure 1, it being noted that this gate 24 is located closely adjacent the discharge end of the bin spout 11 so as to form a sort of pocket or chamber between the gate 24 and the end 12 of the conveyer 8 into which pocket or chamber the material from the bin 10 is discharged. The gate 24 is preferably adjustable and can be made so in any number of ways, one of which is illustrated in connection with Figures 2 and 3 now to be described.

As shown in Figures 2 and 3, I prefer to construct my gate of a pair of steel plates 25 between which is clamped a rubber lining or insert 26, the rubber lining 26 projecting outwardly at the sides so as to fit tightly against the vertical side walls of the trough 8. This prevents leakage of material or wedging of material between the sides of the trough and the adjacent edges of the gate, and also serves to prevent the lower or free end of the gate from vibrating violently during operation, especially at times when the conveyer trough is empty. The gate proper is mounted between a pair of guide plates 27 having bottom foot or angle portions 28 adapted to span the conveyer 8 and rest upon the outwardly extending flanges 29 thereof, to which latter they may be secured in any suitable manner. The guide plates are formed with a series of vertically disposed adjusting holes 30 and the gate is provided with a single hole 31 in vertical registry with the series 30. By means of these holes it is possible to raise or lower the gate and thereby adjust the degree of opening between the bottom of the gate and the bottom of the conveyer trough to whatever degree may be desired, the gate being held in its position of selected adjustment by means of the bolt 32 and nut 33.

To the rear of the gate and just behind the bin spout 11 I prefer to introduce a back partition 34 which extends transversely across the conveyer 8 to form a receiving pocket around the outlet of the bin spout which is even more restricted than in the embodiment of Figure 1. The wall 34 as shown is preferably introduced at an angle corresponding to the angle of the bin spout 11.

The material 35 to be conveyed by the trough fills the compartment or chamber 36 to substantially the upper limit of the spout opening, as shown by the cross hatching in Figure 2. When the conveyer is at rest, the material will flow out of the spout 11 and fill this chamber to roughly the degree indicated in the drawings. When the conveyer is in operation, its vibration or reciprocation will draw the material out from this chamber under the bottom edge of the gate, in the manner indicated by the cross hatching, the upper lever 37 of the material being perfectly straight and uniform, as indicated, so as to give a very accurate control of the quantity of material conveyed and delivered by the trough.

Figure 4:
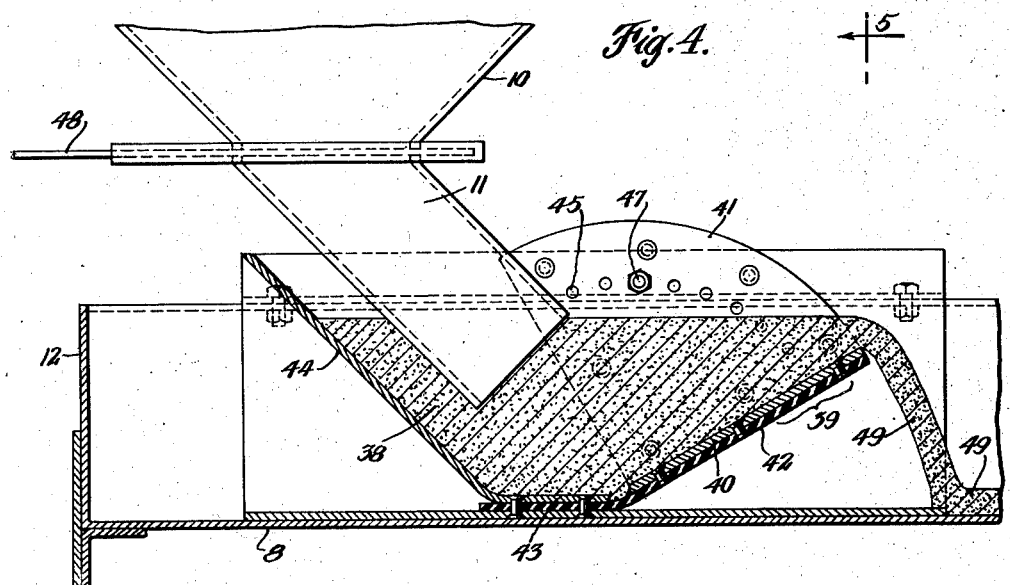
Figure 4 is a view similar to that of Figure 2 but illustrating a modified form of control mechanism.
Figure 5:
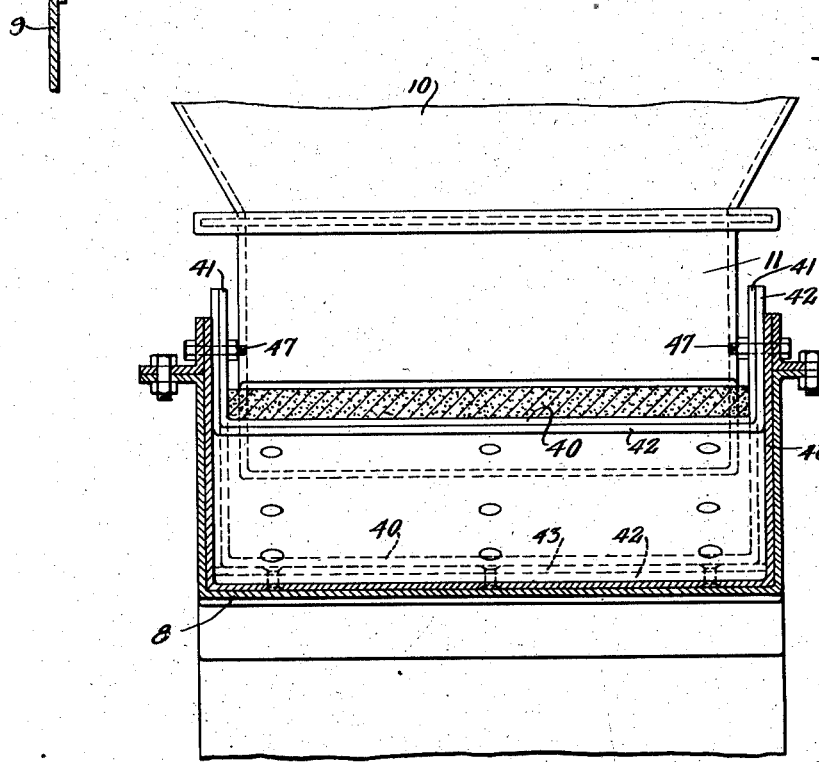
Figure 5 is a section on the line 5—5 of Figure 4.

In Figures 4 and 5 I have illustrated a modified form of controlling gate which is particularly useful where the material 38 to be transported may be somewhat more irregular in particle size, i. e., where there may be larger and smaller lumps. Where this situation exists the underpass gate of Figures 2 and 3 may prove to be somewhat troublesome, because the larger pieces may catch at the bottom edge of the gate and tend to clog the passage.

In Figures 4 and 5 this problem is overcome by using a gate in the form of a weir or dam 39 which I prefer to construct of a steel plate 40 having vertical ends or sides 41. The outer face of the ends 41 and the bottom face of the plate 40 are covered with rubber 42 or other suitable material, the rubber being extended rearwardly to fit under the horizontal end 43 of the rear closure plate 44, so that it can serve as a hinge around which the weir can swing in order to adjust the degree of opening of the gate. Of course, the rubber also serves, as before, to make a tight fit with the conveyer trough and prevent jamming of material between the gate and the trough as well as to prevent vibration and reduce noise.

The side plates 41 are provided with a series of openings 45 arranged in an arc of a circle struck from the center of the hinge, and the side walls of the feed box 46 are provided with a suitable aperture which will register with the apertures 45 so that the gate 39 may be held in its position of pre-selected adjustment by means of a bolt and nut arrangement 47 entirely similar to the bolt and nut arrangement shown in Figures 2 and 3.

In connection with Figures 4 and 5 it will be noted that I construct my weir or dam gate in a suitable feed box which snugly fits and is secured in the trough 8 in the manner clearly illustrated in the drawings. This, of course, is not essential to the invention as the weir or dam 39 could be introduced directly into the conveying trough 8, but I find that the construction illustrated is a matter of particular convenience because it can be fabricated as a unit and subsequently placed in position in any conveyer where it may be desired to use my invention.

In Figures 4 and 5 I have also shown a shut-off slide gate 48 at the base of the bin 10 which can be used for completely shutting off the flow in case of making repairs or the like. It is to be understood, however, that I do not intend to use the gate 48 in any way as a control mechanism, the control being effected entirely by the weir or dam 39 over which the material cascades in a manner somewhat analogous to that of a waterfall, as shown by the cross hatching at 49, it being noted that as the material strikes the bottom of the trough it has a uniform cross section and height, so that the net effect of this type of control is exactly the same as is that of the control illustrated in Figures 1 to 3. In both modifications the material is withdrawn from the feed box through the gate opening by action of the conveyer, and when the conveyer stops reciprocating the feed from the bin 10 also stops.

Figure 6:
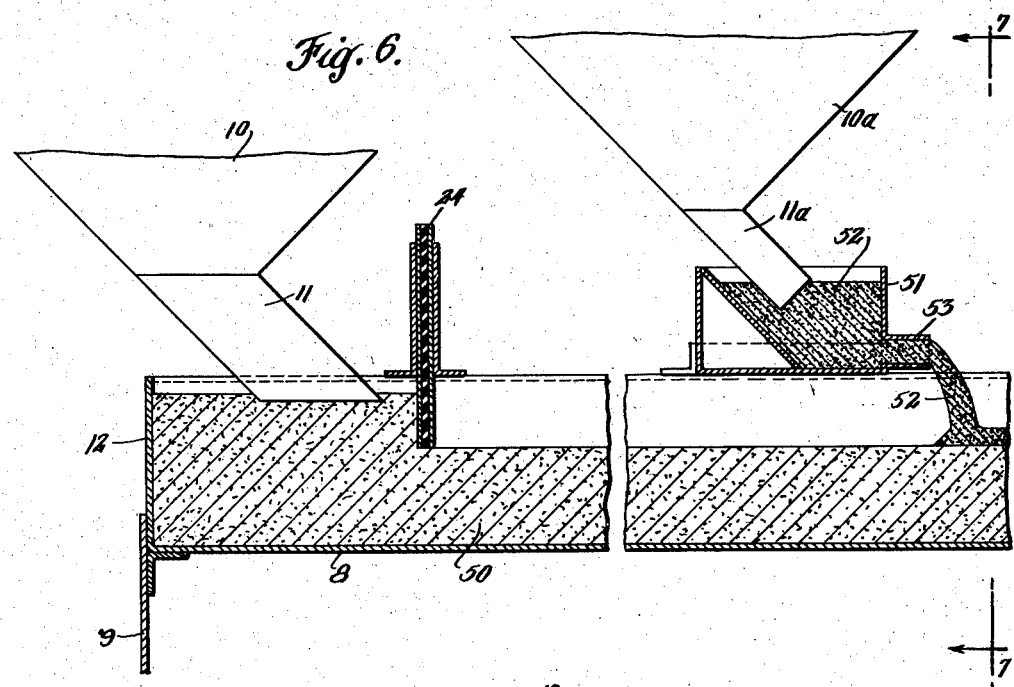
Figure 6 is a vertical longitudinal section through an arrangement wherein two materials are being transported in desired proportion.
Figure 7:
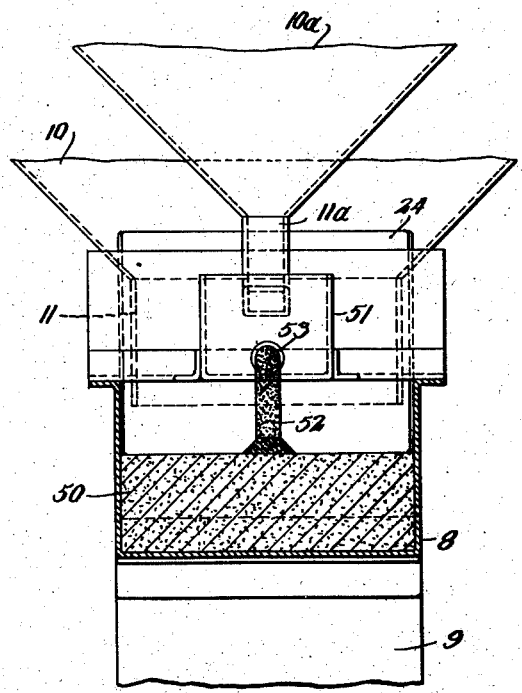
Figure 7 is a section on the line 7—7 of Figure 6.

In Figures 6 and 7 I have illustrated an embodiment of my invention which makes possible the very uniform and accurate proportioning of at least two materials. Here, as in Figures 1 to 3, I have provided a gate 24 for regulating the flow from the bin 10 and spout 11, the material discharging therefrom being indicated by the reference character 50. At a point beyond the gate 24 I mount a second feed box 51 on top of the conveyer sides, as clearly shown in these figures. This feed box is supplied from a second bin 10a having a spout 11a, the material coming therefrom being indicated by the reference character 52. The outlet from the feed box 51 is shown as a simple cylindrical or tubular passage 53 adjacent the bottom and approximately in the center thereof, so that the material 52 will fall down upon the middle portion of the material 50 in the conveyer 8. It is not essential that the discharge opening 51 be in the form shown, but could take the form of any of the gate mechanisms which are disclosed in this application or which may be the equivalent thereof. However, I find it convenient to use this type of discharge opening because the supplemental material 52 may constitute only a small proportion of the total flow in the conveyer 8 and this arrangement is very convenient and provides great accuracy and positiveness of control for a relatively small amount of material.

It will be obvious that since the feed box 51 is mounted upon the conveyer 8 it will partake of the motion of the conveyer and that the material 52 will flow therefrom or be drawn therefrom exactly as though it were directly in the conveyer. Furthermore, the flow will be constant and uniform and the proportion accurately maintained just as long as the supplies from the bins 10 and 10a are adequate and the conveyer is in operation, and when the conveyer stops the flow from both bins will stop also.

It will be seen that my improved controlling mechanism makes possible a very accurate control of the material delivered by the conveyer which is particularly valuable in many industries where careful measurement is required as between ingredients entering into a manufacturing operation. The equipment is particularly useful with very fine materials, although it can be used with coarser materials, especially in the form shown in Figures 4 and 5. The apparatus will not tend to further comminute or break up the material to be conveyed but will allow it to flow in the form in which it leaves the supply bin. Furthermore, the flow from the bin spouts will be very uniform and will have very little tendency to clog unless the material happens to be wet, and even in this instance the apparatus will function more satisfactorily than have previous conveyers known to the art, because the vibrating motion of the conveyer is imparted to the particles of material in the bin spout which naturally helps to keep them freely flowing.

My improved device is exceedingly simple, accurate and dependable, can be relatively inexpensively manufactured and easily and cheaply maintained in service. Its accuracy of measurement is remarkable and makes the device available for many operations where a reciprocating conveyer could not otherwise be employed.

I claim:

1. In conveyer mechanism, the combination of a reciprocating conveying trough, a material delivery spout, means carried by the trough to move in unison therewith and forming a relatively restricted compartment into which the material is discharged from said delivery spout, and an outlet from said compartment through which the material is withdrawn by action of the reciprocating trough.

2. The device of claim 1 wherein the compartment outlet is adjustable whereby to regulate the quantity of material carried by the trough.

3. In a reciprocating conveyer in which the conveying action is produced by differential vibration, the combination with the conveying element of a material delivery spout and a relatively restricted compartment, said compartment being carried by the conveying element to move in unison therewith and having an adjustable gate past which the material is withdrawn by the reciprocation of said conveying element.

4. In a reciprocating conveyer in which the conveying action is produced by differential vibration, the combination with the conveying element of a material delivery spout projecting into the conveying element, and an adjustable gate carried by the conveying element to move in unison therewith and lying across the conveying path at a point adjacent to the delivery spout.

5. In a reciprocating conveyer in which the conveying action is produced by differential vibration of a conveying element and wherein there is provided a supply bin having a delivery spout which discharges into the conveying element, the combination of a feed box mounted on the conveying element to move in unison therewith, a second supply bin having a delivery spout which discharges into said feed box, and an outlet from said feed box through which the material from said second bin is withdrawn by the movement of the conveyer and discharged into the conveying element to be transported with the material from said first bin.

6. In conveyer mechanism, the combination of a reciprocating conveying trough, a delivery spout projecting into the trough, and a weir in the trough adjacent the discharge opening of said spout over which the material is withdrawn by action of the reciprocating trough, said weir being mounted to move in unison with the trough.

7. In a reciprocating conveyer in which the conveying action is produced by differential vibration, the combination with the conveying element of a material delivery spout and a relatively restricted compartment, said spout projecting into said compartment and the compartment being mounted to move in unison with the conveying element and having an adjustable weir over which the material is withdrawn by the reciprocation of said conveying element.

EDWARD F. TAFEL.